United States Patent [19]

Avery

[11] Patent Number: 4,664,003
[45] Date of Patent: May 12, 1987

[54] LATHE WORKHOLDER

[76] Inventor: Dennis Avery, 3328 Del Paso Blvd., Sacramento, Calif. 95815

[21] Appl. No.: 737,788

[22] Filed: May 28, 1985

[51] Int. Cl.4 .............................................. B23B 33/00
[52] U.S. Cl. .................... 82/40 R; 279/1 A; 279/110
[58] Field of Search ................ 82/40 R, 45; 279/1 A, 279/1 SJ, 1 ME, 1 L, 15, 110, 123

[56] References Cited

U.S. PATENT DOCUMENTS

| 601,513 | 3/1898 | Hartness. | |
|---|---|---|---|
| 1,956,904 | 5/1934 | McClintic. | |
| 2,686,058 | 8/1954 | Zetterberg | 279/110 |
| 2,757,008 | 7/1956 | Lane | 279/110 |
| 2,759,735 | 8/1956 | Cross | 279/110 |
| 2,998,258 | 8/1961 | Ambrose | 279/1 A |

Primary Examiner—Leonidas Vlachos
Attorney, Agent, or Firm—Leonard Bloom

[57] ABSTRACT

A lathe workholder which allows a conventional three jaw chuck to turn quadrilateral stock having a first unitary workholder member interposed between two of the jaws and the stock and having a crotch portion which straddles two sides of the stock; a second workholder member interposed between the remaining jaw and the stock and diametrically opposed from the first member and having a crotch portion which straddles the remaining two sides of the stock, so that the conventional three jaw chuck can be utilized to retain quadrilateral stock and lathe down time is reduced.

15 Claims, 7 Drawing Figures

LATHE WORKHOLDER

BACKGROUND OF THE INVENTION

The following invention relates generally to workholders for lathes which allows a conventional three jaw chuck to turn quadrilateral stock material.

More particularly, the instant invention is directed to an instrumentality for obviating the necessity of tearing down a lathe in its entirety when one is required to turn square stock. Frequently, it is necessary to turn square stock or rectangular stock in an operation which constitutes a minor portion of a turning job. In such cases, it has been required to remove the existing three jaw chuck system, install a four jaw chuck and thereafter put the work stock in for the turning operation and center the work stock. Once this operation has been completed, of course, the original three jaw chuck must be replaced. Even a highly skilled artisan must spend perhaps 30 minutes or more for first removal and then replacement of the four jaw system, without the centering operation even considered. This provides a nettlesome problem, particularly when the turning operation is for a relative small quantity and the machine must be reconverted almost immediately thereafter.

There have been known prior art attempts in causing conventional three jaw chucks to lend themselves to utilization by square stock. The instant invention is easily distinguished over these known prior art techniques in that the effort involved in placing the workholder members according to the instant application is no more cumbersome than the effort required in placing the square stock in the jaws of the lathe. Thus, there is no discernible investment of time that is required for utilization of the instant device, particularly when contrasted with the known prior art.

Further, the instant invention is distinguished over the known prior art in that an instrumentality has been provided which allows a conventional three jaw chuck to turn quadrilateral stock which is formed preferably from first and second unitary workholder members diametrically opposed within a circumscribed area defined by the innermost faces of the three jaw chucks, each member having a somewhat V-shaped portion defining a crotch which engages respectively two sides of the quadrilateral stock. One of the members is caused to lay against two of the conventional jaws with the other member diametrically opposed therefrom. When the jaws are clamped tight, an aligned secured piece of square stock will be held without any of the wobble or precession that normally accompanies conversion from one known prior art system to another without centering.

SUMMARY AND OBJECTS OF THE INVENTION

Accordingly, this invention has as its objective the provision of a new and novel lathe workholder which allows a conventional three jaw chuck to turn quadrilateral stock.

It is yet a further object of this invention to provide a device as characterized above in which quadrilateral stock of varying dimensions can be accommodated.

It is yet a further object of this invention to provide a device as characterized above which is durable in construction, lends itself to mass production techniques, and is extremely safe to use.

A further object of this invention contemplates providing a device as characterized above which substantially and materially alters the down time required in converting conventioal lathes from one system which accommodates non-square stock to one which does.

A further object of this invention contemplates providing a device as characterized above which eliminates the centering step normally required in the prior art conversion.

A further object of this invention contemplates providing a device as characterized above which addresses itself to the long-felt yet heretofore unfulfilled need of providing a means for accommodating different geometrically figured stock materials without excessive down time, particularly advantageous when the conversion is so temporary due to a small production requirement that the prior art techniques spend more time in the conversion than the actual lathe operation.

These and other objects will be made manifest when considering the following detailed specification taken in conjunction with the appended drawing figures wherein there has been provided an instrumentality which allows a conventional three jaw chuck on a lathe to be adapted to turn quadrilateral (square or octagonal) stock including first and second unitary workholder members, one of which is interposed between two of the jaws and the stock and the second member is interposed between the remaining jaw and the stock diametrically opposed from the first member, each of the members having a substantially V-shaped crotch portion adapted to gird respectively two sides of the quadrilateral whereby the operation for inserting the square stock with the workholder members takes substantially the same amount of time as placing conventional stock material within the lathe workholder chuck for normal lathe operations.

BRIEF DESCRIPTION OF THE DRAWING FIGURES

BRIEF DESCRIPTION OF THE PREFERRED EMBODIMENT

Figure 1:
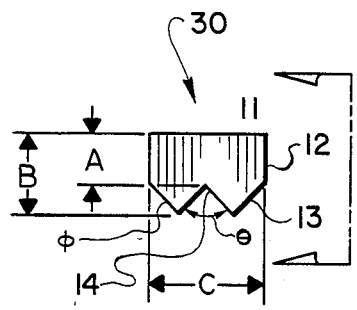
FIG. 1 is an end view of a workholder second member according to the present invention.

Referring to the drawings now, wherein like reference numerals refer to like parts throughout the various drawing figures, reference numeral 10 is directed to the lathe workholder according to the present invention.

Figure 4:
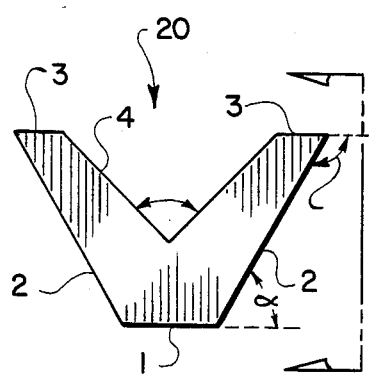
FIG. 4 is an end view of the first workholder member according to the present invention.

As shown in FIG. 4, a first unitary workholder member 20 or base block is formed preferably from a durable non-deformable material and preferably a hardened metal such as steel. The base block 20 includes a base portion (first base) 1 and a pair of upwardly and outwardly extending side walls 2 emanating from a first end from the base 1 at an angle alpha with respect to an extension of the base and an outer face of the wall. In a preferred embodiment, the angle alpha equals 60°.

Each side wall terminates at a second, opposite end with two inwardly extending shelf portions 3 parallel to the base portion 1, the shelf portions 3 in turn allowing a transition in which a V-shaped crotch (first crotch) 4 is downwardly and inwardly declinated with respect to the base 1. The two walls (inner faces) forming the V-shaped crotch have a subtended angle theta which in a preferred form is 90° and therefore is not parallel with walls 2. The subtended angle between the two (i.e. upwardly extended lines of sidewall 2 and crotch wall 4) is preferably 15°. The side wall and shelf portion has at a line extending beyond the shelf providing a subtended angle beta with respect to the side wall which in a preferred form is 120°.

In a preferred form, the base portion 1 has an overall dimension of ⅝", each shelf is ⅜", and the height of the base block or first unitary workholder member is 1¼" with an overall length L of 2½". The overall wingspan taken from shelf 3 extremities is 2".

Figure 7:
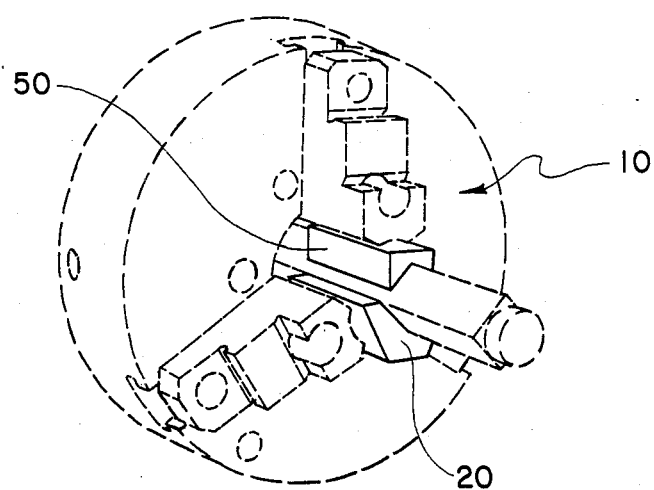
FIG. 7 is a perspective view of the apparatus in situ, with the conventional lathe jaw chuck assembly shown in phantom for illustrative purposes.

Similarly, FIG. 1 reflects one form 30 of a second workholder member which may be used in place of the element 50 shown in FIG. 7. Alternatively, the element 40 may be substituted therefor depending upon the dimension of the 4-sided work stock to be turned as will be explained hereinafter.

Irrespective, the second workholder member 30 of FIG. 1 includes a second base having top wall (outer face) 11 of a second base, integral with the first end of a pair of normally and downwardly extending side walls 12 and further V-shaped crotch (second crotch) 14. Rather than having a horizontal shelf as shown in FIG. 4, a pair of canted walls 13 is provided communicating the V-shaped crotch 14 with the side walls 12. The angle phi denotes the degree of declination of the shelf 13 as it communicates the V-shaped crotch 14 with the side walls 12, and in a preferred form of the invention, the angle phi is 45°.

It can be seen that placement of the second workholder member onto the first workholder member or base block 20 will cause the shelves 13 to lie upon the walls formed by the V-shaped crotch 4 of the base block 20. Thus, for extremely small stock, an extremely strong interconnection exists between these workholder members, the stock and the convention three jaw chuck since the bearing surface of the shelf 13 against the V-shaped crotch 4 precludes wobbling or displacement of the stock given an appropriate dimension for the second workholder member.

Figure 2:
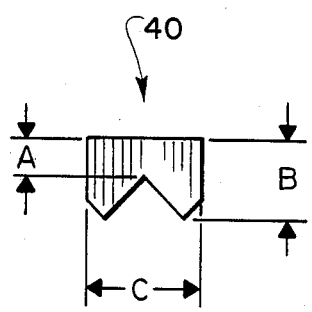
FIG. 2 is similar to FIG. 1 having a somewhat different relationship of geometrical surfaces.
Figure 5:
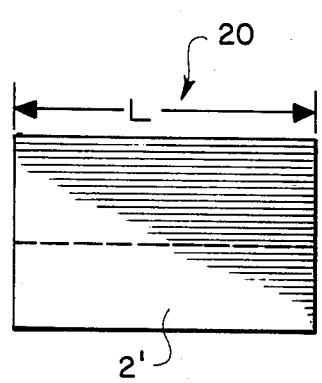
FIG. 5 is a side view taken along lines V—V of FIG. 4.
Figure 6:
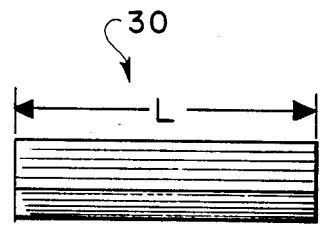
FIG. 6 is a side view taken along lines VI—VI of FIG. 1.

More particularly, note that the primary difference between that which is shown in FIG. 1 and FIG. 2 is the relative magnitude of the dimensions A and B which therefore can alter the dimension of the shelf 13 since in FIG. 1 the deepmost portion of the crotch 14 is coincident with the transition between the shelf 13 and the (inner faces) side wall 12, while in FIG. 2 that connection point has been changed somewhat. In any event, for bar stock less than 9/16", dimension A may vary between 3/16" and ⅜". Dimension B may vary from ½" to ¾" and the width C may be 2". As shown in FIG. 6, the overall length L of the second workholder member is also 2½", similar to FIG. 5 of the base block 20.

Figure 3:
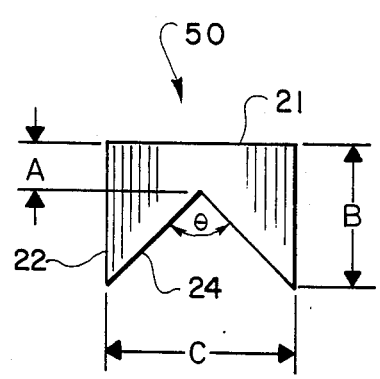
FIG. 3 is an alternative embodiment to that which is shown in FIGS. 1 and 2 and is used to accommodate stock material having a different dimension from that which is shown in either FIG. 1 or FIG. 2.

FIG. 3 is directed to the embodiment of the second workholder member shown in FIG. 7 which is adapted to accommodate bar stock 9/16" or larger. The dimension of the bar stock allows for the second workholder member to remain sufficiently high and away from the V-shaped crotch 4 of the base block that there is no practical necessity in having a shelf portion 13 similar to FIGS. 1 and 2. Thus, a top wall 21 and a pair of normally and downwardly extending side walls 22 when combined with the V-shaped crotch 24 define the entire second workholder in this embodiment. Here dimension A varies from 3/16" to ⅜", the width C is ¾", and the height varies from ½" to ¾".

In use and operation, as suggested in FIG. 7, the base block 20 is allowed to nest upon the work engaging jaws of two of the three jaws and provides a cradle within which the square bar stock is placed. The second workholder member is caused to straddle the two sides of the bar stock remote from the base block, the second workholder member diametrically opposed from the base block such that the intersection of the walls (inner faces) of each crotch touch corners of the bar stock and a line passing through each crotch would bisect the stock material. Appropriate tightening of the conventional three jaw chuck allows the expeditious utilization of this device without having to center the stock which is commonly required when converting from a three jaw to a four jaw system. Preferably, as shown in the figures, each of the inner faces as well as the outer faces of each workholder has a substantially planar portion for engaging, respectively the workpiece and the jaws.

Having thus described the invention, it should be apparent that numerous structural modifications are contemplated as being a part of this invention as set forth hereinabove and as defined hereinbelow by the claims.

What is claimed is:

1. A workholder adapter for clamping a quadrilateral-sided workpiece within a conventional three-jaw lathe chuck having respective first, second and third radially-movable chuck jaws, comprising:
    a first workholder member including a first base, a pair of outwardly-extending sidewalls, each having a first end integral with the first base and a second, opposite end being remote therefrom, each of said sidewalls having an outer face for engaging, respectively, the first and the second chuck jaws, said sidewalls further having an inner face for engaging a respective side of the workpiece, said inner faces intersecting one another at the first base, whereby a first crotch is defined, and wherein two adjacent sides of the workpiece are so engaged by the inner faces in said first crotch;
    a second workholder member, including a second base having an outer face for engaging the third chuck jaw, a pair of side walls, each having a first end integral with the second base and a second opposite end being remote therefrom, each of said sidewalls having a respective inner face for engaging a respective side of the workpiece, said inner faces intersecting one another at the second base, whereby a second crotch is defined, and wherein the remaining two sides of the workpiece are so engaged by the inner faces in said second crotch.

2. The workholder adapter of claim 1, wherein the outer faces of the sidewalls of the first workholder member each include a substantially planar portion for engaging the first and second chuck jaws.

3. The workholder adapter of claim 1, wherein the inner faces of the sidewalls of the first workholder member each include a substantially planar portion for engaging a respective side of the workpiece, wherein two adjacent sides of the workpiece are so engaged.

4. The workholder adapter of claim 1, wherein the outer face of the second base includes a substantially planar portion for engaging the third chuck jaw.

5. The workholder adapter of claim 1, wherein the inner faces of the sidewalls of the second workholder member each include a substantially planar portion for engaging a respective side of the workpiece, wherein two adjacent sides of the workpiece are so engaged.

6. The workholder adapter of claim 1, wherein each respective second opposite end of the sidewalls of the first workholder member terminate in a respective, substantially-planar shelf, each of said shelves being positioned on a substantially identical plane.

7. The workholder adapter of claim 1, wherein the inner faces of the first workholder member perpendicularly intersect one another at the first base.

8. The workholder adapter of claim 1, wherein the inner faces of each sidewall of the first workholder member are oriented skew with respect to the orientation of the outer face of the respective sidewall.

9. The workholder adapter of claim 1, wherein each sidewall of the second workholder member further has an external face being oriented substantially perpendicular to the second base.

10. The workholder adapter of claim 9, wherein each of the inner faces of each respective sidewall of the second workholder member intersects the respective external face at the second remote end.

11. The workholder adapter of claim 1, wherein the inner faces of the second workholder member perpendicularly intersect one another at the second base.

12. The workholder adapter of claim 1, wherein each sidewall of the second workholder member further has an external face and a canted face positioned between and communicating with the respective inner face and external face thereof.

13. The workholder adapter of claim 12, wherein each canted face is inwardly extending.

14. The workholder adapter of claim 12, wherein each external face of the sidewalls of the second workholder member is oriented substantially perpendicular to the base and further wherein each canted face is oriented substantially perpendicular to the inner face of the respective sidewall.

15. A workholder adapter for clamping a quadrilateral-sided workpiece within a conventional three-jaw lathe chuck having respective first, second and third radially-movable chuck jaws, comprising:

a first workholder member including a first base, a pair of outwardly extending sidewalls, each having a first end integral with the first base and a second, opposite end being remote therefrom, each of said side walls having a respective substantially planar outer face for engaging, respectively, the first and the second chuck jaws, said sidewalls further having a respective, substantially-planar inner face for engaging a respective side of the workpiece, each of said inner faces oriented skew with respect to the orientation of the outer face of the respective side wall, said inner faces perpendicularly intersecting one another at the first base, whereby a first crotch is defined, wherein two adjacent sides of the workpiece are so engaged by the inner faces in the first crotch;

a second workholder member, including a second base having a substantially-planar external face for engaging the third chuck jaw, a pair of side walls, each having a first end integral with the second base and a second opposite end being remote therefrom, each of said sidewalls having a respective, substantially-planar inner face for engaging a respective side of the workpiece, said inner faces perpendicularly intersecting one another at the second base, whereby a second crotch is defined, wherein the remaining two sides of the workpiece are so engaged by the inner faces in the second crotch.

* * * * *